C. W. FERTIG & A. J. MAY.
DENTAL CHAIR.
APPLICATION FILED MAY 18, 1915.
1,233,859.
Patented July 17, 1917.
5 SHEETS—SHEET 5.
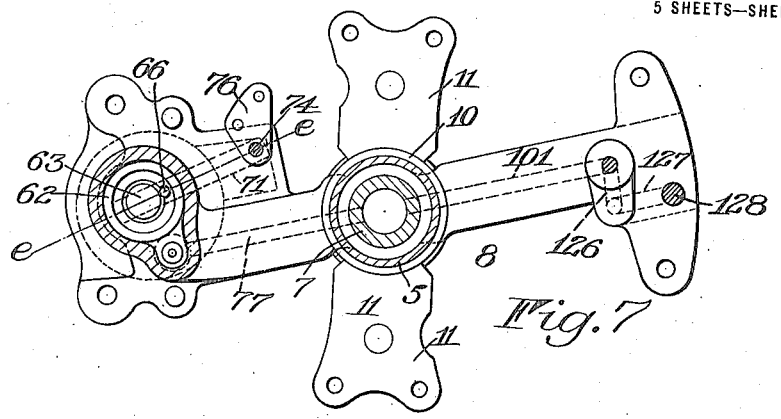
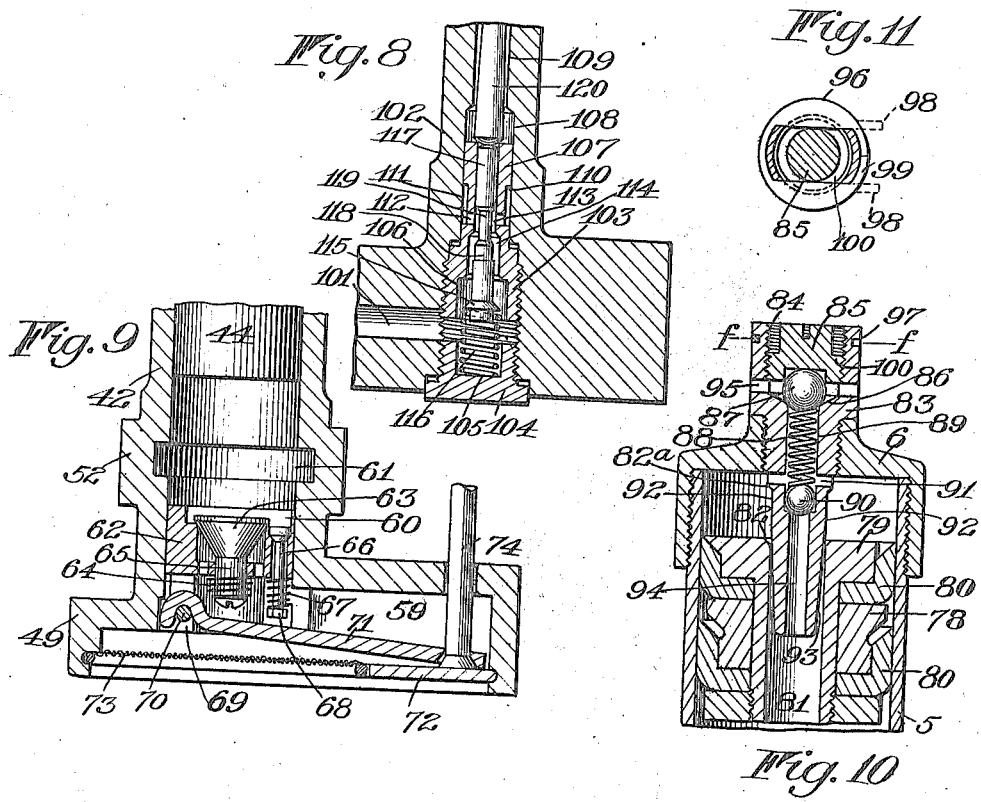
WITNESSES:
Walter B. Payne
F. Jerdone Jr.
INVENTORS
Charles W. Fertig
Adam J. May
BY
their ATTORNEYS

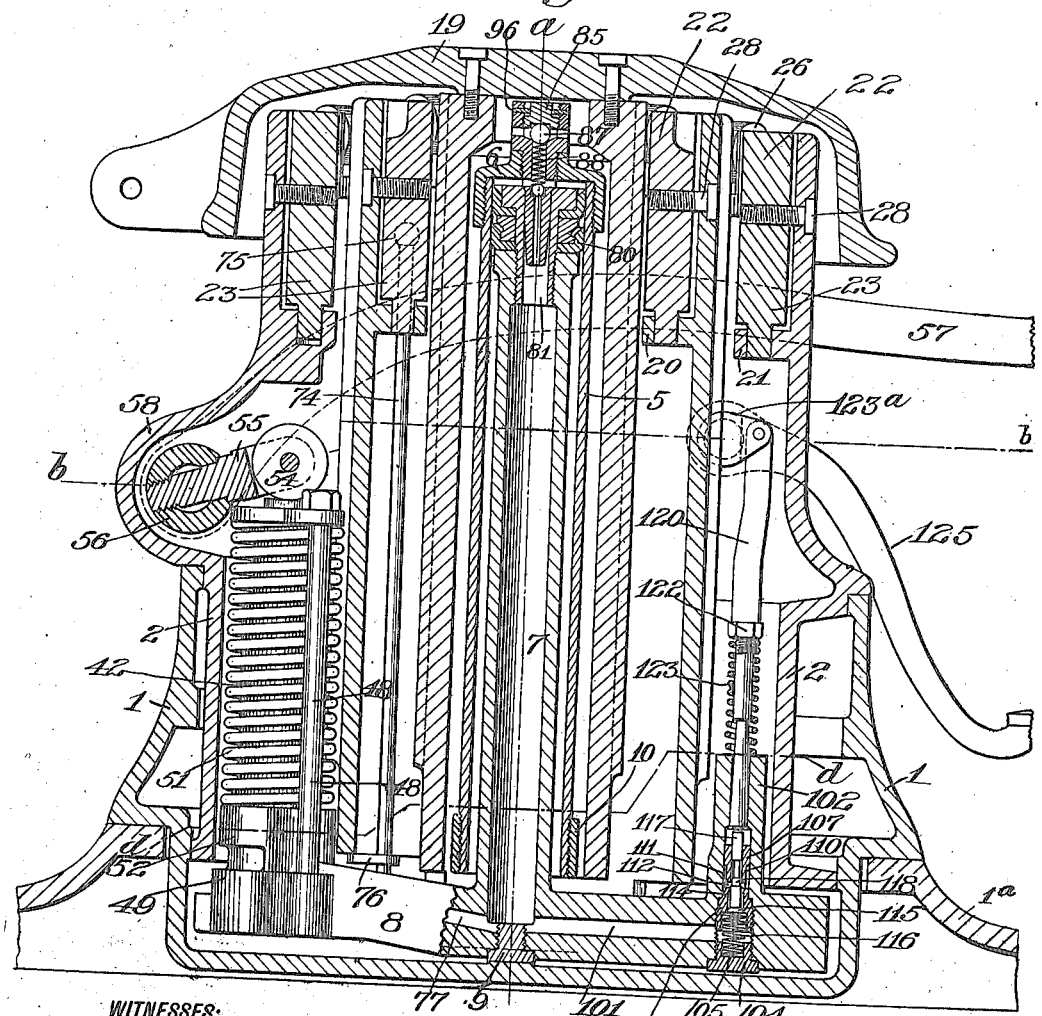

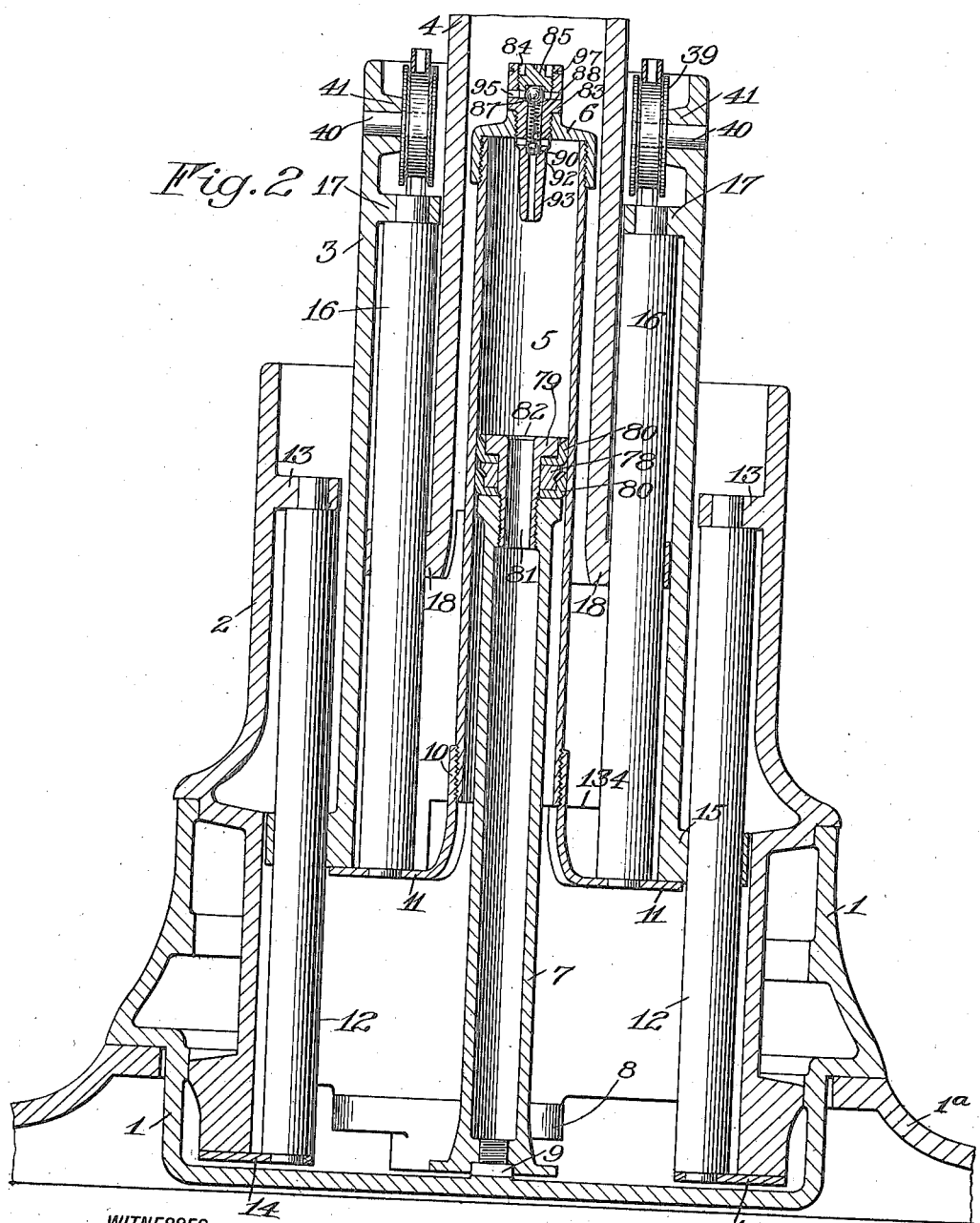

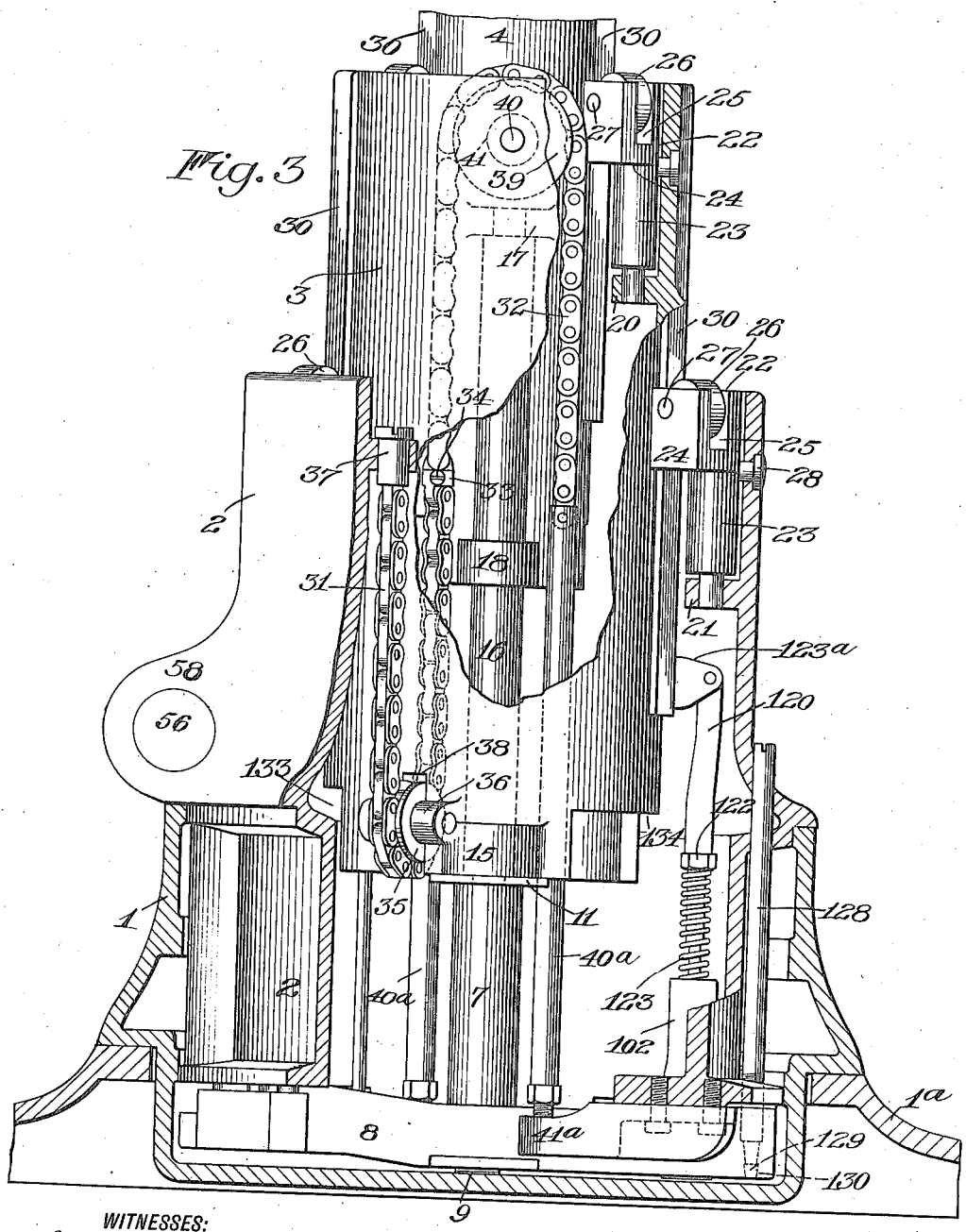

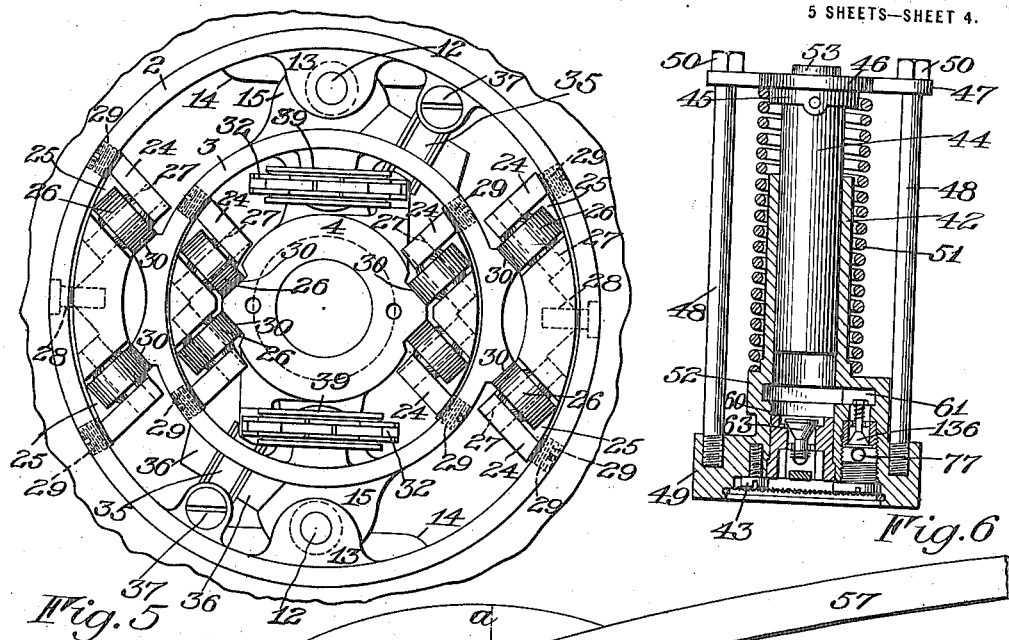
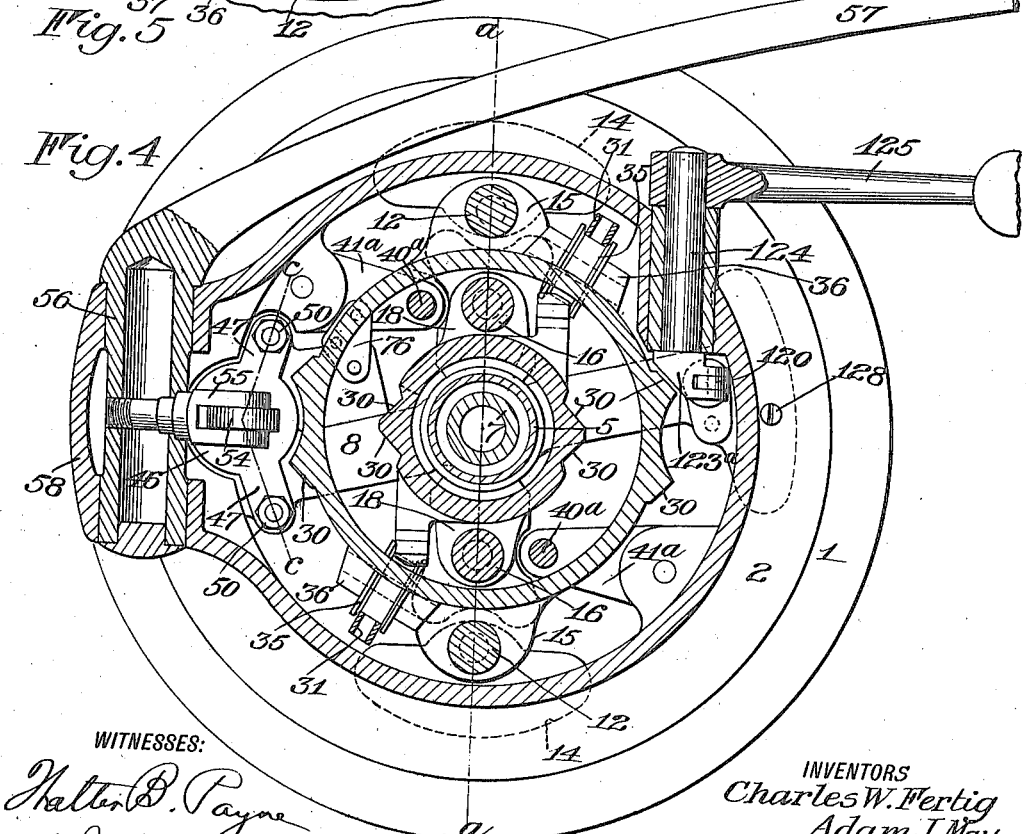

UNITED STATES PATENT OFFICE.

CHARLES W. FERTIG AND ADAM J. MAY, OF ROCHESTER, NEW YORK, ASSIGNORS TO ADELINA RITTER SHUMWAY AND LAURA A. RITTER, DOING BUSINESS AND TRADING AS RITTER DENTAL MANUFACTURING COMPANY, OF ROCHESTER, NEW YORK.

DENTAL CHAIR.

1,233,859.

Specification of Letters Patent.

Patented July 17, 1917.

Application filed May 18, 1915. Serial No. 28,820.

*To all whom it may concern:*

Be it known that we, CHARLES W. FERTIG and ADAM J. MAY, of Rochester, in the county of Monroe and State of New York, have invented certain new and useful Improvements in Dental Chairs; and we do hereby declare the following to be a full, clear, and exact description of the same, reference being had to the accompanying drawings, forming a part of this specification, and to the reference numerals marked thereon.

This invention relates to improvements in dental chairs and has for an object to provide a practical, easily operated, and comfortable moving chair. A further object of the invention is to provide means for elevating and lowering the several telescoping sections simultaneously and at relatively different speeds, using the same mechanism to accomplish both the up and down movements of the sections.

Another object of the invention is to provide means whereby when the sections have reached their extreme elevation, should the pump be continued to be operated, the slight up and down or jerking movement usually occurring in most dental chairs will be obviated and the chair seat allowed to remain at rest on the central section.

With these and other objects in view the invention comprises certain novel features of construction and arrangement of parts as will be hereinafter fully described and claimed.

In the drawings:

Figure 1 is a vertical sectional view through the base and pedestal of a dental chair, showing the assembled parts in their normal or lowermost position;

Fig. 2 is a vertical sectional view taken on line *a—a* of Fig. 4, showing the telescoping sections in an elevated position;

Fig. 3 is a vertical sectional view through the pedestal and base having a portion of the outer telescoping section broken away to more clearly indicate the chain lifting mechanism;

Fig. 4 is a sectional view taken on line *b—b* of Fig. 1;

Fig. 5 is a top plan view showing the relative positions of the inner and outer telescoping sections together with the arrangement of friction rollers for guiding the sections in their up and down movement;

Fig. 6 is a detail sectional elevation of the pump mechanism taken on line *c—c* of Fig. 4;

Fig. 7 is a horizontal sectional view of the spider taken on line *d—d* of Fig. 1;

Fig. 8 is an enlarged detail sectional view of the release valve shown in Fig. 1, in an open position;

Fig. 9 is an enlarged detail sectional view through the bottom of the pump on line *e—e* of Fig. 7, showing the mechanism designed to open the pump release valve when the telescoping sections have reached the limit of their upward movement;

Fig. 10 is an enlarged detail sectional view through the upper end of the cylinder and piston showing the position of the parts just before the cylinder has reached its lowermost position, and Fig. 11 is a sectional plan view on line *f—f* of Fig. 10, showing the construction of a locking washer.

Similar reference numerals are used throughout the several figures of the drawing to indicate corresponding parts.

Referring to the drawings by numerals, 1 denotes a base carried by the usual floor plate 1ª shown broken away in Figs. 1, 2 and 3, and within said base 1 is mounted a cylindrical casing 2 arranged to revolve therein without being elevated therefrom, said base 1 serving as a reservoir for the liquid by which the chair is raised and lowered. Positioned within the casing 2 are outer and inner telescoping sections 3 and 4 respectively. Within the section 4 is positioned a cylinder 5 provided at its top with a cylinder head 6. Mounted in the cylinder 5 is a piston 7 connected with a spider 8 which is spaced a short distance above the base 1 but arranged to be supported thereby through the medium of a screw member 9 resting on the base at the center thereof. The cylinder 5 is connected with the telescoping section 3 through the medium of a yoke 10 into which the cylinder is screwed. The yoke 10 is provided with diametrically opposing arms 11 engaging the bottom of the outer telescoping section 3. Guide rods 12 for guiding the outer section 3 are mounted on the inner wall of the cylinder casing 2. The upper ends of the rods are journaled in lugs 13 projecting from the casing and the lower ends journaled in plates 14 secured to the bottom of the cylinder casing. The outer telescoping section 3 is slidably mounted on the rods 12 through the medium of lugs 15 projecting from the section. Similar guiding rods 16 are positioned on the inner wall of the outer section 3 and have their top ends journaled in lugs 17 projecting from the section and their lower ends journaled in the arms 11 of the yoke 10. The inner telescoping section 4 is slidably mounted on the guide rods 16 by means of lugs 18 projecting from the inner section. Secured to the top of the inner telescoping section 4 is provided a chair seat frame 19 of any approved or suitable design.

As a further guiding means and particularly means to prevent a lateral or rocking movement of the outer and inner telescoping sections during their ascent and descent, a system of rollers are provided for the steadying of each of the sections regardless of whether it is being elevated or lowered. In embodying this improvement in the present invention, lugs 20 and 21 are provided on the inner walls of the outer telescoping section and the cylinder casing 2 respectively. Loosely journaled in the lugs 20 and 21 are adjustable roller supporting members 22. The roller supporting members are provided with cylindrical portions 23 carrying extensions 24 at the top thereof in which are formed slots 25 having mounted therein a pair of rollers positioned at substantially right angles to each other. The rollers are mounted on journals 27 seated in the extensions 24. The outer faces of the roller supporting members are made to conform to the inner peripheries of the outer telescoping section 3 and the cylindrical casing 2 and are held against displacement by a screw 28, which also serves the purpose of adjusting the rollers transversely. Adjusting screws 29 are positioned in the walls of the outer telescoping section and the casing 2 for the purpose of engaging the back of the roller carrying members 22 at the ends thereof to pivotally adjust the members, in order to regulate the angular position of the rollers with respect to the inner and outer telescoping sections. The telescoping sections are provided on their outer faces with oppositely arranged tracks 30 positioned in pairs substantially at right angles to each other upon which the rollers are adapted to travel when the sections are moving up and down in the casing. By turning the screws 29 in or out as the occasion demands the rollers may be shifted so that they will be thrown in perfect alinement with the tracks 30 of the telescoping sections. The rollers have been positioned at the tops of the cylinder casing and outer telescoping section and as far away from the guiding lugs at the bottom of the sections as possible in order to more substantially brace the sections and prevent rocking or side motion of the same in the up and down movements thereof. As a means for carrying out the simultaneous raising and lowering of the inner and outer sections a chain is provided which is formed of sections 31 and 32 and secured together by a connection 33 which is fastened to the inner telescoping section near the bottom thereof by a screw or bolt 34. A pulley 35 journaled in lugs 36 at the bottom of the outer telescoping section is adapted to receive the chain section 31 which has its end opposite to the connection 33 secured to an adjusting screw 37 journaled in a lug extending from the inner face of the cylindrical casing. The pulley 35 is positioned in a slot 38 formed in the bottom of the outer telescoping section in order that the pulley and chain may not project below the bottom of the section to prevent the same from extending substantially to the bottom of the base 1. Pulleys 39 are mounted on journals 40 positioned in lugs 41 extending inwardly from the walls of the outer telescoping section at the top thereof. The pulleys 39 are placed at an obtuse angle to the pulley 35 at the bottom of the telescoping section 3. The chain section 32 extends over the pulley 39 and downwardly to connect with a rod $40^a$ secured to a lug $41^a$ connected to the bottom of the casing 2. As a means for elevating the telescoping section a pump cylinder 42 is provided preferably formed integral with the spider 8 which is designed to be secured to the bottom of the casing 2 by means of suitable bolts or otherwise. The cylinder 42 has positioned therein a plunger 44 connected at the top thereof with a cap 45 provided with a flange 46 carrying arms 47 adapted to receive rods 48 extending downwardly and screwed into a base 49 forming a part of the spider 8 upon which the cylinder 42 is mounted. The rods 48 are provided with heads 50 normally engaging the arms 47 which are held in contact with the heads through the medium of a spring 51 having its upper end bearing against the under side of the flange 46 and its lower end against an enlargement 52 supported by the base 49. The flange 46 is provided in the center thereof with a circular projection 53 adapted to receive a roller 54 journaled in a finger 55 adjustably mounted in a shaft portion 56 of a pumping lever 57. The shaft portion 56 is journaled in an extension 58 of the casing 2 at the front thereof. The pump base 49 mounted on the spider 8 has formed therein an elongated recess 59 having extending therefrom a valve chamber 60 connecting with an enlarged chamber 61 positioned in the annular enlargement 52. Positioned in the valve chamber 60 is a valve seating member 62 held in position by a screw 43 and carrying a check valve 63 normally held closed by a spring 64, mounted on a stem 65 supporting the valve. A by-pass valve 66 is also mounted in the seating member 62 and is normally held closed by a spring 67 bearing on the bottom of the seating member 62 and at its lower end against a nut 68 carried by the stem of the valve 66.

Depending from the valve seating member 62 is a member 69 carrying a horizontal shaft 70 upon which is rotatably mounted a normally inclined lever 71 having its outer end resting upon a plate 72 held by the base 49. A screening member 73 is secured within the under side of the base 49 and is connected at the other side with the plate 72 for the purpose of preventing waste material from passing to the valves 63 and 66 when the pump is being operated. Secured in the end of the lever 71 is an upstanding rod 74 provided at the top thereof with a knob 75 adapted to be engaged by a plate 76 secured to the bottom of the outer telescoping section 3 when the section has reached substantially its uppermost position. The purpose of this mechanism is to provide means whereby when the telescoping sections have reached their uppermost positions, should the pump continue to be operated the usual jerking movement imparted to the chair proper will be obviated and the chair seat allowed to remain at rest upon the central section. This is accomplished by the fact that when the plate 76 engages the knob 75 the lever 71 will be raised until it engages the nut 68, carried by the stem of the valve 66, to raise the valve and allow the oil which is being drawn through the check valve 63 to discharge past the valve 66 and back into the reservoir. By reason of the fact that the valve 66 is of very small area the power necessary to force the oil past the valve when it is open is practically the same as would be required to elevate the chair.

In forcing the oil through the pump to elevate the telescoping sections the roller 54 bearing on the projection 53 is forced downwardly through the medium of the finger 55 the shaft 56 and the pump lever 57. When the lever is released by the foot of the operator the spring 51 forces the plunger 44 upwardly drawing in oil from the reservoir through the check valve 63 into the chamber 61. The downward stroke of the plunger 44 forces the oil through a check valve 136 in the chamber 61 and into port 77 in the spider 8 and up through the piston 7 into the cylinder 5 causing the outer telescoping section to be elevated through the medium of the yokes 11. In elevating the outer telescoping section the inner section will also be elevated, since it is connected to the outer section by means of the connection 33 and the chain section 32 passing over the pulley 39 and anchored to the rod 40ᵃ.

It is obvious that from the way in which the pulleys and chain are arranged with respect to the telescoping sections that in elevating or lowering the sections the inner section will travel at twice the speed of the outer section so that although the sections start from the bottom of the casing at the same time when the outer section reaches its extreme height the inner section will also have reached its extreme height. The piston 7 is provided with a head having a member 79 adapted to screw into the end of the piston and to hold in position thereupon the packing rings 80 held apart by a spacing member 78. The member 79 has formed through the center thereof an aperture 81 enlarged at the top to form a valve seat 82 intended to receive the tapered shoulder 82ᵃ at the top of the straight portion 92 when the sections reach their lowermost position. The cylinder head 6 is provided with a valve containing member 83 screwed into the head and having an opening 84 formed in the top thereof to receive a screw plug 85. In the bottom of the opening 84 a valve seat 86 is formed to receive a ball valve 87 normally held in a closed position by the screw plug 85. A spring 88 positioned in an aperture 89 of the containing member has one end engaging the ball valve 87 and the other end engaging a smaller ball valve 90 positioned in the bottom of the aperture 89. A little above the ball valve 90 a transverse aperture 91 is formed through the valve containing member connecting with the aperture 89 and opening into the top of the cylinder 5. Below the ball valve 90 the valve container extends downwardly a short distance with a straight portion 92 and therebelow is provided with a tapered portion 93, the straight portion 92 being slightly smaller in diameter than the aperture 81. An aperture 94 through the straight and tapered portions 92 and 93 connects with the apertures 91 and 89.

An aperture 95 is formed through the containing member immediately below the screw plug 85 and connects with the apertures 89 and 94. In Fig. 11 is shown the plan view of a locking washer 96 adapted to fit in a groove 97 formed in the valve container 83 for the purpose of preventing the screw plug 85 from being entirely removed from the container and thereby becoming displaced or lost. The washer before being applied is open on one side thereof as indicated by the dotted portions 98 and after it has been inserted in the groove 97 the members 98 are hammered down as shown at 99. A shoulder 100 is carried by the screw plug 85 which shoulder engages the washer when the plug has been unscrewed sufficiently to elevate the shoulder to the under face of the washer.

The purpose of the straight and tapered portions 92 and 93 of the containing member 83 is to provide a cushioning means to quickly though smoothly arrest the momentum of the sections when they have dropped substantially to the bottom of the casing 2 on their downward stroke. This is accomplished through the entrance of the tapered portion 93 into the aperture 81 and the gradual closing of the aperture until the straight portion 92 begins to enter therein, after which time the escape of oil through the aperture around the straight portion is still further restricted until the sections have come to rest at the bottom of the casing, there still being left at this time a limited cushioning space filled with oil between the cylinder and piston heads as the tapered shoulder 82ª comes to rest in the cavity 82.

In setting up the chair ready for use it is necessary to get rid of a certain amount of air naturally accumulating in the piston 7 and cylinder 5. This is accomplished by unscrewing the plug 85 until the shoulder 100 thereon engages the locking member 96 thus allowing the spring 88 to raise the ball valve 87 off of its seat so that the aperture 89 will communicate with the aperture 95. When this is done oil is pumped into the piston and cylinder forcing the air out through the apertures until the cylinder is filled with oil, after which the plug 85 is screwed down to return the ball valve permanently to its seat to prevent the escape of oil from the cylinder.

The ball valve 90 is adapted to keep the aperture 94 closed, particularly during the descent of the straight and tapered portions 92 and 93 into the aperture 81 in order that the cushioning effect above described may be maintained when the sections are descending from an elevated position. However when the sections are to be lifted and the pump is once begun to be operated the ball valve will be raised against the pressure of the spring 88 by the force of the oil in the piston until the oil passes through the aperture 91 into the cylinder to elevate the same along with the telescoping sections.

As an improved means for releasing the supporting column of liquid holding the telescoping sections at any elevation a discharge port 101 in the spider 8 leads from the piston 7 to an improved valve positioned in the end of the spider opposite the pump supporting end. An upstanding projection 102 is carried by the spider to receive parts of the valve mechanism as shown in Figs. 1 and 8. The projection 102 extends upwardly into the cylinder casing and outside of the outer telescoping section. At the end of the port 101 immediately under the upstanding projection 102 the spider is bored and threaded to receive a valve seating plug 103. Below this plug and in axial alinement therewith is placed a screw plug 104 having formed in the center thereof a chamber 105 in alinement with a chamber 106 formed in the valve seating plug 103. The seating plug is provided with a cylindrical extension 107 positioned in a chamber 108 from which extends through the projection 102 a reduced opening 109. The extension 107 is reduced at 110 to form a circular chamber 111 connecting with an aperture 112 which aperture connects with a central opening 113 formed in the extension 107. The central opening connects with an enlarged chamber 114 superimposed upon the chamber 106. A valve 115 is adapted to normally close the chamber 114 through the medium of a spring 116 having one end seated in the chamber 105 and the other end bearing on the under side of the valve in the chamber 106. The valve 115 is provided with a stem 117 the upper end of which is adapted to close the opening 113 in the extension 107. The stem 117 is provided with a reduced portion 118 and a still smaller reduced portion 119 operating in the central opening 113. Normally resting upon the upper end of the stem 117 is a plunger 120 having a tapered portion positioned in the opening 109. Above the tapered portion of the plunger a nut 122 is screwed thereon to receive one end of a spring 123, the other end of which spring rests on the top of the projection 102. The plunger 120 is pivotally connected at its top to an arm 123ª connected with a shaft 124 journaled in the wall of the casing 2. Mounted upon the end of the shaft is a foot lever 125 for depressing the plunger to open the valve 115 when it is desired to lower the telescoping sections from their elevated positions.

In order to make the escape of the oil from the liquid supporting column gradual when the chair is to be lowered, means for accomplishing this result is provided through the medium of the reduced portions 118 and 119, the opening 113, the aperture 112 and the chamber 111 connecting with a port 126 which also connects with another port 127 leading through the bottom of the spider as shown in Fig. 7. In lowering the chair the operator presses down on the foot lever 125 opening the valve 115 through the medium of the plunger 120 and the valve stem 117, thus allowing oil to flow from the port 101 to the chamber 106 and into the reduced chambers 114 and 113 through the aperture 112 into the chamber 111 and thence through the ports 126 and 127 to the reservoir in the chair base 1. In releasing the foot lever 125 the spring 116 begins to close the valve 115 and it is while the reduced portion 118 is passing into the chamber 113 that the very gradual reduction of the outflow of the oil is accomplished as the reduced portion is made slightly smaller in diameter than the diameter of the chamber 113. It is during this period of the closing of the valve that the cushioning effect is obtained and held until the valve closes. The portion of the plunger 120 positioned in the opening 109 is tapered as shown to take care of the slight rocking movement imparted to the plunger by the depression of the arm 123 to which the plunger is pivotally connected. As a means for controlling and fixing the exact amount of oil that may be allowed to escape from the valve just described a needle valve of the ordinary type is provided at the end of the port 127 as shown in Figs. 3 and 7, and is controlled by a rod 128 extending through the cylinder casing 2 and into the end of the spider 8, having a tapered portion 129 adapted to be adjusted with respect to a taper outlet 130 leading from the port 127 to the reservoir in the chair base.

The guiding lugs 15 on the bottom of the outer telescoping section are adapted to rest upon the plates 14 secured to the bottom of the casing when the section reaches its lowermost position. In order that the outer section may clear the spider 8 and lug 41ª when it has descended to the bottom of the casing, cuts 133 and 134 are provided for this purpose as shown in Fig. 3. The spider 8 is adapted to be secured to the bottom of the casing 2 by means of suitable bolts, holes for which are shown in Fig. 7. In order to throw the entire weight of the descending telescoping sections upon the central piston 7 of the spider 8 the screw member 9 is arranged to project slightly below the spider to engage the base 1 so that the weight of the descending parts will fall entirely upon this member and thus prevent the possibility of cracking the spider extensions.

We claim as our invention:

1. In a chair base, the combination with a pedestal, section guides therein, a movable outer telescoping section mounted on the guides, guide members positioned in the section, a movable inner chair raising section mounted on the last mentioned guides, of a pulley mounted at the top of the outer section above the guides therein and a pulley mounted at the bottom of said section, a flexible connection secured intermediate its ends to the inner section and having one portion extending under the bottom pulley and anchored near the top of the pedestal and the other portion extending over the top pulley and anchored near the bottom of the pedestal, and means for adjusting the length of the flexible member.

2. In a chair base, the combination with a pedestal and outer and inner telescoping sections movable relatively to the pedestal and to each other, and mechanism for elevating the sections, of a pair of pulleys mounted at the top of the outer section at opposite sides of the inner section, a pair of radially and diametrically disposed pulleys journaled at the bottom of the outer section, having their inner peripheral edges lying beneath the edge of a corresponding top pulley, a flexible connection attached to the inner section intermediate the pulleys and having its end portions passing thereover, and anchored to the pedestal.

3. In a chair base, the combination with a pedestal, a movable outer column mounted therein, a movable chair raising column mounted in the outer column, of a pair of tracks arranged in sets of twos upon opposite sides of each of the columns, and an adjustable roller carrying member provided with rollers in engagement with each pair of tracks.

4. In a chair base, the combination with a pedestal, a movable outer section mounted therein, a movable chair raising section mounted in the outer section, a pair of tracks positioned upon the outer section, of a roller carrying member mounted upon the pedestal and having rollers normally in engagement with the tracks, and means for adjusting the roller carrying member to throw the rollers in and out of engagement with the tracks.

5. In a chair base, the combination with a pedestal, movable inner and outer chair raising sections mounted in the pedestal, a pair of tracks positioned upon the inner section, of a roller carrying member carried by the outer section and having rollers normally positioned upon the tracks, and means for adjusting the roller carrying member with respect to the tracks to give each of the rollers equal adjustment.

6. In a chair base, the combination with a pedestal, a movable section telescoping therein, having spaced tracks positioned thereupon, of a roller carrying member pivotally mounted with respect to the tracks and provided with rollers positioned upon each of the tracks.

7. In a chair base, the combination with a pedestal, a movable section telescoping therein having spaced tracks positioned thereupon, of a roller carrying member provided with rollers positioned upon the tracks, said roller carrying member being pivotally mounted with respect to the tracks, and each of the rollers being independently adjustable upon its own track.

8. In a chair base, the combination with a pedestal, a movable section telescoping therein having spaced tracks positioned thereupon, of a roller carrying member provided with rollers positioned upon each of the tracks and means for adjusting the roller carrying member transversely.

9. In a chair base, the combination with a pedestal, a movable section telescoping therein and having spaced tracks positioned thereupon, of a pivotally mounted roller carrying member provided with rollers in each side thereof positioned upon said tracks and an adjusting screw at each end of the roller carrying member for adjusting the rollers with respect to the tracks.

10. In a chair base, the combination with a pedestal, a movable section telescoping therein, and hydraulic mechanism for elevating the latter, of a relief valve in conjunction with the hydraulic mechanism, a pivotally mounted member positioned adjacent the relief valve, and means carried by the movable section for moving the pivotally mounted member to open the relief valve and relieve the lifting power of the hydraulic mechanism whenever the movable section reaches substantially its uppermost position.

11. In a chair base, the combination with a pedestal, a movable section telescoping therein and hydraulic mechanism for elevating the section, of a relief valve in conjunction with the hydraulic mechanism, a pivotal member positioned adjacent the relief valve, an extension carried by the pivotal member, and means carried by the movable section to engage the extension when the movable section has reached substantially its uppermost position to cause the pivoted member to open the relief valve for the purpose of discontinuing the lifting power of the hydraulic mechanism and allow the movable section to remain at rest regardless of the continued operation of the hydraulic mechanism.

12. In a chair base, the combination with a pedestal, a movable section telescoping therein, and hydraulic mechanism for elevating the section comprising a valve chamber having inlet and outlet valves and operating mechanism therefor, of a relief valve positioned in the chamber, a lever pivoted adjacent the valve, an upstanding member carried by the lever, and a projection carried by the movable section and adapted to engage the upstanding member when the movable section reaches substantially its uppermost position for the purpose of operating the lever to open the relief valve to provide for the escape of liquid therethrough instead of through the outlet valve to prevent further pressure from being imparted to the movable section.

13. In a chair base, the combination with a pedestal, outer and inner telescoping sections arranged within the pedestal, and mechanism for elevating the sections, of an improved liquid discharge valve for lowering and cushioning the sections comprising a valve proper carrying an extension, a chamber surrounding said extension larger in area than the extension, a reduced chamber connecting with the last mentioned chamber, a port leading from the reduced chamber, a reduced portion carried by the extension and slightly smaller in section than the reduced chamber and normally resting in the reduced chamber, means for simultaneously moving the reduced portion out of the reduced chamber into the larger chamber and moving the valve to open the larger chamber, and means for returning the valve and extensions to their normal positions whereby the return of the members gradually reduces the outlet area of the chambers leading to the port thereby providing a cushioning effect upon the descending sections.

14. In a chair base, the combination with a pedestal, outer and inner telescoping sections mounted in the pedestal, and mechanism for elevating the sections, a liquid outlet, of a discharge valve communicating with said outlet for lowering and cushioning the sections comprising a valve proper carrying an extension provided with reduced portions adjacent each other and intermediate the ends of the extension proper, a chamber normally closed by the valve and receiving the portion of the extension adjacent the valve, said chamber being larger transversely than the extension, a smaller chamber connecting with the first mentioned chamber normally receiving the outer end of the extension and the two reduced portions of the extension, said chamber being larger transversely than either of the reduced portions, the smaller of which is adjacent the outer end of the extension, a port leading from the smaller chamber opposite the larger of the reduced portions of the extension, means for moving the extension to open the larger valve chamber and to simultaneously force the larger of the reduced portions out of the smaller chamber and to move the smaller of the reduced portions opposite the port in the smaller chamber to form a reducing outlet for the escape of liquid, and means for returning the valve and stem to their normal positions whereby the entrance of the larger reduced portion to the smaller chamber still further restricts the escape of liquid to cushion the descending sections.

15. The combination with a chair base and hydraulic operating mechanism comprising a cylinder and a piston arranged therein, of a vent valve in the end of the cylinder comprising a valve casing having positioned therein a valve normally held closed by a screw plug in the end of the casing, said plug being reduced at the top to form a shoulder thereon, the casing being provided with upstanding portions having grooves formed in the outer faces thereof a slight distance above the top of the shoulder portion of the plug when the plug is screwed down on the valve, a substantially U-shaped plate member having pliable extensions projecting therefrom, the bottom of said U-shaped member adapted to be positioned in the groove of one of the upstanding members and the pliable extensions adapted to be hammered down into the groove of the opposite upstanding member after the screw plug has been screwed down upon the valve, whereby displacement of the plug will be prevented by the shoulder thereon engaging the sides of the U-shaped member when the plug is turned outwardly a slight distance to open the valve substantially as shown.

16. The combination with a chair base, movable telescoping sections mounted in the base, and hydraulic mechanism comprising a movable cylinder and a stationary piston arranged therein, a cylinder head mounted on the cylinder, of a cushioning valve comprising a seat formed in said piston with an aperture extending therefrom and arranged to coact with an extension carried by the cylinder head having a shoulder portion spaced from said head and a dependent straight portion slightly smaller in diameter than said aperture, said straight portion carrying a tapered portion adapted at the end of the downward stroke of the sections to gradually reduce the discharging capacity of said aperture until said straight portion descends therein to further restrict the outlet area thereof, previous to the engagement of said shoulder with said seat, whereby a gradually closed cushioning chamber is provided between said cylinder and said piston.

17. In a chair base, the combination with a pedestal, a movable section telescoping therein, and hydraulic mechanism for elevating the latter, of a relief valve in conjunction with the hydraulic mechanism located at the bottom thereof for relieving the lifting power of the mechanism, a lever arm extending beneath the valve and means acting to raise the lever as soon as the movable section has reached substantially its uppermost position.

18. In a chair base, the combination with a pedestal, a movable section telescoping therein, a pump for elevating the latter, a relief valve at the bottom of the pump movable for relieving the lifting power of the pump, and means carried by the movable section for actuating the relief valve when said section reaches substantially its uppermost position.

CHARLES W. FERTIG.
ADAM J. MAY.

Witnesses:
G. WILLARD RICH,
RUSSELL B. GRIFFITH.